Figure 1:
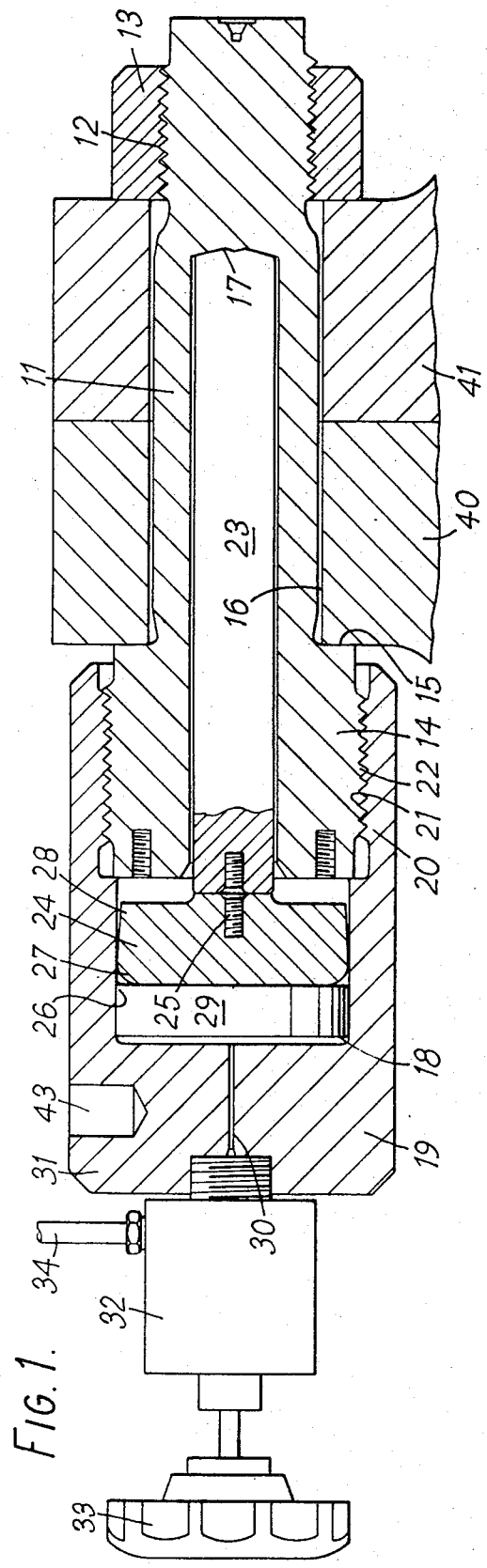

Stansfield

United States Patent [19]

[11] 3,835,523

[45] Sept. 17, 1974

[54] SELF-STRAINING BOLTS

[75] Inventor: Fred Stansfield, Oldham, England

[73] Assignee: P & O Research & Development Company Limited, London, England

[22] Filed: Mar. 6, 1973

[21] Appl. No.: 338,425

[30] Foreign Application Priority Data

Mar. 8, 1972 Great Britain..................... 10727/72

[52] U.S. Cl.......................... 29/252, 29/452, 85/1 T
[51] Int. Cl............................................ B23p 11/02
[58] Field of Search...................... 29/252, 446, 452; 254/29 A; 85/1 T, 62; 81/57.38

[56] References Cited
UNITED STATES PATENTS
2,934,968  5/1960  Neumann et al. ................ 29/452 X FOREIGN PATENTS OR APPLICATIONS
855,134  11/1970  Canada............................ 254/29 A Primary Examiner—Al Lawrence Smith
Assistant Examiner—Harold P. Smith, Jr.
Attorney, Agent, or Firm—Woodcock, Washburn, Kurtz & Mackiewicz

[57] ABSTRACT

A self-straining bolt includes a shank and a rod of steel or like stiff rigid material which fits with clearance in an axial bore within the shank of the bolt, the bore being closed at one end. A closed cylindrical chamber is secured to the end of the bolt remote from the closed end of the bore, and a piston member which has an overall diameter greater than that of the bore, is fitted in the chamber. The piston member is a close sliding fit in the cylindrical chamber and engages the end of the rod adjacent the chamber. A disc of a resilient material with a hardness in the range of Shore hardness 10 to 100, and preferably 40 to 70, and a thickness of at least ⅜ inch, and preferably at least ½ inch, abut the working face of the piston and bears with its periphery against the cylindrical wall of the chamber so as to form a seal. A conduit extends through the wall of the chamber for connecting the chamber to a source of fluid under pressure whereby a pressure can be applied to the piston through the disc to cause the rod to press against the closed end of the bore and strain the shank of the bolt. The disc prevents fluid leaking from the chamber through the space between the piston and the cylindrical wall of the chamber.

9 Claims, 2 Drawing Figures

PATENTED SEP 17 1974 3,835,523

SELF-STRAINING BOLTS

The present invention relates to improvements in bolts which can have their shanks stressed without the use of a nut. Such bolts are commonly referred to as self-straining bolts and are useful in that they may readily be tensioned and stretched to a prearranged accurate strain and the tensioning and stretching can be carried out remote from the work to be bolted. After tensioning the bolt can be inserted in the workpiece to be bolted, a nut can be screwed on the end of the bolt and the originally applied pretensioning force can be relieved.

One form of self-straining bolt has within its shank an axial bore which extends through a major portion of the shank and which is closed at one end. A rod of steel or similar stiff rigid material is fitted with clearance in the bore and has a piston at its outer end which is a close sliding fit in a closed cylindrical chamber rigid with the end of the bolt remote from the closed end of the bore. Pressure is applied from the exterior to the chamber to move the piston axially of the bolt towards the closed end of the bore causing the rod to be pressed against the closed end and the shank of the bolt to be strained.

The pressure may be applied to the piston by turning screws which extend through the wall of the chamber and which act on an incompressible deformable material such as rubber or plasticine filling the chamber. Alternatively the pressure may be applied to the piston hydraulically.

The use of hydraulic pressure is advantageous in that sources of hydraulic pressure are often at hand in places where self-straining bolts are required and in that they enable substantial pressure to be reached in the chamber very quickly. There is however the problem of providing a satisfactory seal to prevent the hydraulic fluid from leaking through the clearance space between the side of the piston and the wall of the cylindrical chamber. Cup washers which have been used in the past for such seals may be satisfactory for relatively low pressures, but at high pressures, and here pressures in excess of 10,000 pounds per square inch are contemplated, the cup washers are not satisfactory.

The present invention consists of a self-straining bolt including a shank, a rod of steel or like stiff rigid material which fits with clearance in an axial bore within the shank of the bolt, the said bore being closed at one end, a closed cylindrical chamber rigid with the end of the bolt remote from the closed end of the bore, and a piston member which has an overall diameter greater than that of the bore, which is a close sliding fit in the cylindrical chamber and which engages or is formed integrally with the end of the rod adjacent the chamber, a disc of a resilient material with a hardness in the range of Shore hardness 10 to 100 and a thickness of at least ⅜ inch abutting the working face of the piston and bearing with its periphery against the cylindrical wall of the chamber so as to form a seal, and a conduit extending through the wall of the chamber for connecting the chamber to a source of fluid under pressure whereby a pressure can be applied to the piston through the disc to cause the rod to press against the closed end of the bore and strain the shank of the bolt and the disc prevents fluid leaking from the chamber through the space between the piston and the cylindrical wall of the chamber. Preferably the hardness of the material of which the disc is made falls in the range of Shore hardness 40 to 70 and preferably the thickness of the disc is at least ½ inch. Below a Shore hardness of 40 there is a danger that the peripheral edge of the disc might be extruded through the space between the piston member and the wall of the cylinder when pressures of the order of 10,000 lbs per square inch are applied. When the pressure is released the extruded edge of the disc would be caught between the piston member and the disc causing deterioration of the disc and eventually failure of the seal. On the other hand, if the material has a Shore hardness in excess of 70, the disc may not be sufficiently deformable to provide a satisfactory seal under high pressure.

To avoid the problems associated with extrusions, the edge of the piston member between its working face and its side may be relieved, by for example rounding, chamfering, or giving the edge a shoulder, to provide an annular space into which material at the periphery of the disc can flow on deformation when pressure is applied to the chamber. The axial extent of the space is preferably at least ⅛ inch.

Figure 2:
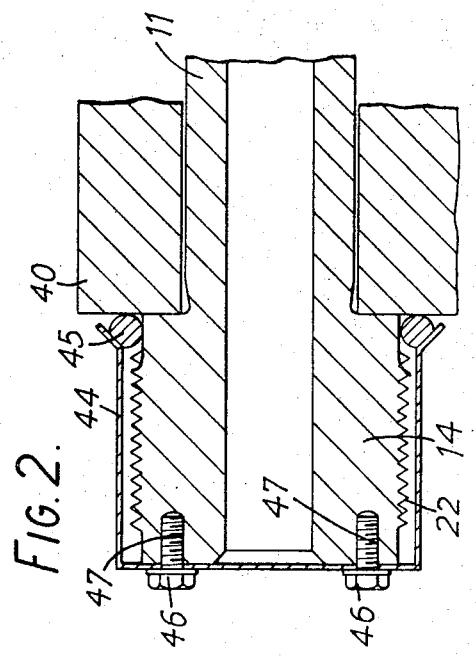

An embodiment of the invention will now be described, by way of example, with reference to the accompanying drawings, of which:

FIG. 1 shows an axial cross-section of a self-straining bolt according to the invention in a workpiece; and FIG. 2 shows an axial fragmentary section of the bolt of FIG. 1 after the pressure has been relieved and the pressure chamber has been removed and replaced by a protective cover.

Referring to FIGS. 1 and 2, the bolt shown here comprises a shank 11, screw-threaded at one end as shown at 12 for the reception of a nut 13 and having an enlarged head portion 14 with a shoulder 15 facing towards the screw-threaded end 12.

The bolt has an axial bore 16 extending from a closed end 17 near the screw-threaded end over a major part of the length of the shank 11 and through the bolt head 14.

A cylindrical pressure chamber 18 is provided by a hollow cup-shaped body 19, the skirt 20 of which is internally screw-threaded 21 for engagement with external screw-threads 22 on the bolt head 14 to effect rigid connection of the body 19 with the bolt head. A passage 30 located in the end wall 31 of the body 19, connects the pressure chamber 18 to the exterior. A valve 32 operable manually by means of a tap 33 is located at the exterior end of the passage 30 and connects the passage to a pipe 34 for connection to a source of hydraulic pressure. The chamber 18 can thus be filled with hydraulic fluid under high pressure by connecting the pipe 34 to a source of fluid at high pressure and opening the valve 32.

A rod 23 of hardened steel is fitted with small clearance in the bore. The rod is slightly longer than the bore so that one end projects from the open end of the bore when its other end is pressed against the closed end. A piston member 24 of larger diameter than the rod 23 is secured to the projecting end of the rod by means of a screw-threaded rod 25. The piston member is a close sliding fit with the cylindrical chamber wall 26 of the chamber. The edge of the piston member between its working face and its side wall is relieved by rounding as shown at 27. The side wall 28 of the piston is also tapered towards the non-working face to facilitate insertion and removal of the piston member.

To provide a seal against leakage of hydraulic fluid from the pressure chamber through the space between the side wall 28 of the piston member and the cylindrical wall 26 of the chamber, a disc 29 of resilient material abuts the working face of the piston member. The disc 29 may have a slight taper, for example, of about 2° in the unstressed state to facilitate assembly. The smaller diameter end of the disc is however slightly larger than the internal diameter of the chamber 18 so that it has to be squeezed slightly on assembly. Thus the periphery of the disc always bears radially outwards against the cylindrical wall of the chamber to provide a seal.

The hardness of the material from which the disc is made and the thickness of the disc in relation to its diameter are such that when a pressure of fluid acts in the chamber 18, the compressing of the disc 29 against the working face of the piston member causes the disc to act radially outwards against the cylindrical wall 26 of the chamber with even greater pressure to improve the seal against the leakage of fluid under pressure. The sealing pressure increases progressively with increasing fluid pressure. For satisfactory operation of the seal the Shore hardness of the material from which the resilient disc is made should be in the range 10 to 100, and is preferably in the range 40 to 70. The thickness of the disc should be at least ⅜ inch and preferably at least ½ inch and should be increased according to the diameter of the disc. It has been found that the disc can provide a perfect seal even when fluid pressures in excess of 10,000 lbs. per square inch are used. The hardness of the resilient disc should preferably not be less than Shore hardness 40 since below that figure there is a danger that the material may be extruded through the clearance space between the side of the piston member and the cylindrical wall of the chamber. On the other hand it should preferably not be greater than Shore hardness 70 since above that figure the material may not be sufficiently deformable to cause the seal to be improved progressively with increasing fluid pressure.

The radius at the end of the piston provides an enlarged annular space between the piston and the wall of the cylinder into which the material at the periphery of the disc can flow on deformation under the pressure of the fluid. As the space is relatively wide, the deformation does not cause extrusion or shearing to occur which would damage the periphery of the disc. Alternatively the edge of the piston member between its working face and its side may be removed by a chamfer or other relief to provide the annular space to accommodate the initial deformation of the disc. Furthermore the peripheral edge of the disc may be rounded, chamfered or otherwise relieved instead of, or in addition to, the radius or chamfer on the piston member to allow the initial deformation required to prevent a shearing or extruding action to occur.

In use, with the parts assembled, and usually before the bolt is inserted in the workpiece such as the apertured plates, 40 and 41, it is pre-tensioned. To do this the pipe 34 is connected to a source of hydraulic fluid under pressure and the valve 32 is opened by means of the tap 33. Fluid flows into the pressure chamber 18 via the passage 30 and pressure is applied through the disc 29 to the piston member 24. The pressure on the piston member forces the rod 23 against the closed end 17 of the bore and the shank of the bolt is strained until the non-working face of the piston bears against the end face 42 of the bolt head. The fluid pressure applied in the chamber 18 may be up to 35,000 lbs per square inch. The valve 32 is then closed and the pipe 34 is disconnected from the pressure source.

The pre-tension bolt is, when required, inserted through the apertures in the plates 40 and 41 until the shoulder 15 bears against the surface of the plate 40 and the nut 13 is screwed on the threaded end 12 until it bears against the surface of the plate 41. The valve 32 is opened to relieve the original pre-tensioning of the shank and allow the hydraulic fluid to drain from the pressure chamber. The plates 40 and 41 are thus clamped together.

The body 19 can now be unscrewed from the head 14 of the bolt. Holes for the insertion of a tommy bar are provided in the body for this purpose. One such hole is shown at 43. With the body 19 removed, the rod 23 is withdrawn from the bore. A cover 44 and an O-ring seal 45 are placed over the head of the bolt to prevent damage to the external screw threads on the head of the bolt. The cover is secured in place by bolts 46 which are fitted in tapped holes 47 in the head of the bolt.

To remove the bolt, the process is reversed. The cover 44 is removed and the rod is inserted in the bore 16. The body 19 is screwed onto the head of the bolt with the piston member in the pressure chamber 18. The pipe 34 is connected to a source of hydraulic fluid under pressure and the bolt is tensioned. The nut 13 can then be unscrewed to allow the bolt to be removed from the plates.

I claim:

1. A self-straining bolt comprising:
   a shank;
   an axial bore in said shank, said bore being closed at one end;
   a rod of steel or like stiff rigid material fitting with clearance said bore within the shank of the bolt;
   a closed chamber with a cylindrical wall rigid with the end of the bolt remote from the closed end of the bore;
   a piston member having a working face and sides and having an overall diameter greater than that of said bore, said piston member being provided at the end of the rod adjacent the chamber and being a close sliding fit in the cylindrical chamber;
   a disc of a resilient material with a hardness in the range of Shore hardness 10 to 100 and a thickness of at least ⅜ inch abutting the working face of the piston and bearing with its periphery against the cylindrical wall of the chamber so as to form a seal; and
   a conduit extending through the wall of the chamber for connecting the chamber to a source of fluid under pressure whereby a pressure can be applied to the piston through the disc to cause the rod to press against the closed end of the bore and strain the shank of the bolt and the disc prevents fluid leaking from the chamber through the space between the piston and the cylindrical wall of the chamber.

2. A bolt according to claim 1 in which the material of the disc has a hardness in the range of Shore hardness 40 to 70.

3. A bolt according to claim 1 in which the edge of the piston member between its working face and its side is relieved to provide an annular space into which material at the periphery of the disc can flow.

4. A bolt according to claim 3 in which said annular space extends axially of the piston for a distance of at least ⅛ inch from the working face of the piston.

5. A bolt according to claim 3 in which the edge is relieved by rounding.

6. A bolt according to claim 1 in which the side of the piston tapers towards the non-working face.

7. A bolt according to claim 1 in which the pressure chamber is provided in a body which is detachable from the shank of the bolt.

8. A bolt according to claim 7 in which the bolt has an externally screw-threaded head and the body has an internally screw-threaded skirt which can be screwed on the head of the bolt.

9. A bolt according to claim 1 in which a manually operable valve is provided in the conduit.

* * * * *